(12) United States Patent
Cook et al.

(10) Patent No.: US 8,558,832 B1
(45) Date of Patent: Oct. 15, 2013

(54) SYSTEM, METHOD, AND COMPUTER PROGRAM PRODUCT FOR GENERATING A PLURALITY OF TWO-DIMENSIONAL IMAGES AND DEPTH MAPS FOR A SCENE AT A POINT IN TIME

(75) Inventors: David Robert Cook, San Jose, CA (US); Gerrit A. Slavenburg, Los Altos, CA (US); Viatcheslav V. Gostrenko, Fremont, CA (US)

(73) Assignee: NVIDA Corporation, Santa Clara, CA (US)

( * ) Notice: Subject to any disclaimer, the term of this patent is extended or adjusted under 35 U.S.C. 154(b) by 1036 days.

(21) Appl. No.: 11/765,382

(22) Filed: Jun. 19, 2007

(51) Int. Cl.
  *G06T 15/40* (2011.01)
  *H04N 13/00* (2006.01)
  *G06K 9/00* (2006.01)

(52) U.S. Cl.
  USPC ............... 345/422; 348/42; 348/43; 348/52; 382/154

(58) Field of Classification Search
  USPC .......... 345/596, 422; 348/42, 43, 53; 382/154
  See application file for complete search history.

(56) References Cited

U.S. PATENT DOCUMENTS

| | | | | |
|---|---|---|---|---|
| 6,111,979 A * | 8/2000 | Katto | | 382/154 |
| 6,456,433 B1 * | 9/2002 | Jones | | 359/466 |
| 6,487,304 B1 * | 11/2002 | Szeliski | | 382/107 |
| 6,614,444 B1 * | 9/2003 | Duluk et al. | | 345/581 |
| 8,111,906 B2 * | 2/2012 | Song et al. | | 382/154 |
| 2003/0035001 A1 * | 2/2003 | Van Geest et al. | | 345/753 |
| 2005/0190180 A1 * | 9/2005 | Jin et al. | | 345/419 |
| 2006/0066612 A1 * | 3/2006 | Yang et al. | | 345/419 |
| 2010/0165077 A1 * | 7/2010 | Yin et al. | | 348/42 |

OTHER PUBLICATIONS

U.S. Appl. No. 11/550,347, filed Oct. 17, 2006.
U.S. Appl. No. 11/750,288, filed May 17, 2007.

* cited by examiner

*Primary Examiner* — Aaron M Richer
*Assistant Examiner* — Robert Craddock
(74) *Attorney, Agent, or Firm* — Zilka-Kotab, PC (57) ABSTRACT

A system, method, and computer program product are provided for generating a plurality of two-dimensional images and a plurality of depth maps for a scene at a point in time. In various embodiments, such two-dimensional images and depth maps may be utilized to generate a plurality of images.

22 Claims, 6 Drawing Sheets

SYSTEM, METHOD, AND COMPUTER PROGRAM PRODUCT FOR GENERATING A PLURALITY OF TWO-DIMENSIONAL IMAGES AND DEPTH MAPS FOR A SCENE AT A POINT IN TIME

FIELD OF THE INVENTION

The present invention relates to display systems, and more particularly to stereoscopic display systems.

BACKGROUND

Figure 1:
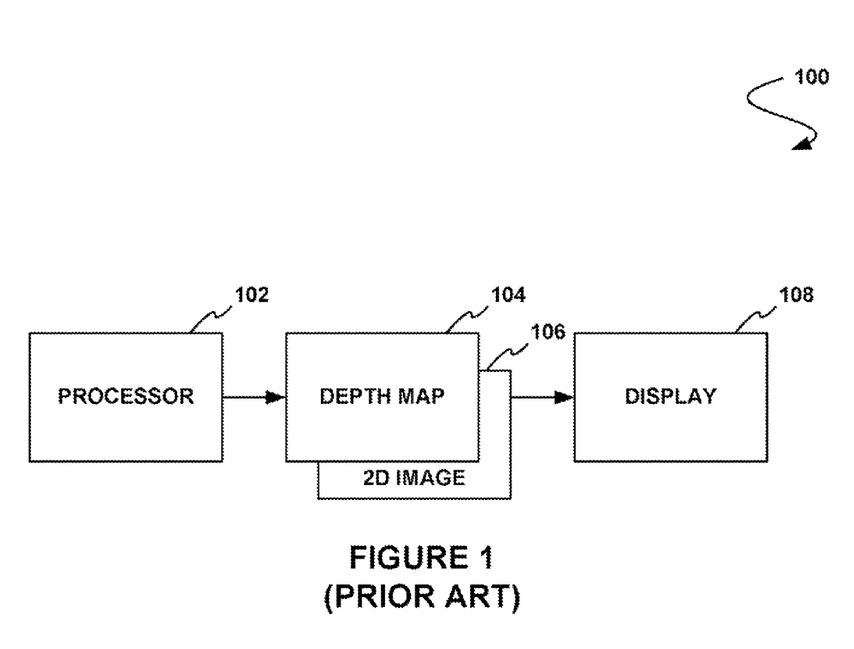
FIG. 1 shows a stereoscopic display system, in accordance with the prior art.

FIG. 1 shows a stereoscopic display system 100, in accordance with the prior art. As shown, a processor 102 (e.g. a graphics processor, etc.) is provided which communicates with a display 108. During use of such a stereoscopic display system 100, various scene information is required to generate different images intended for viewing by a left and right eye of a viewer. Specifically, such scene information is provided to the display 108 in the form of a depth map 104 and a two-dimensional image 106. Such depth map 104 and two-dimensional image 106 together include information describing a single view of a scene.

Figure 2:
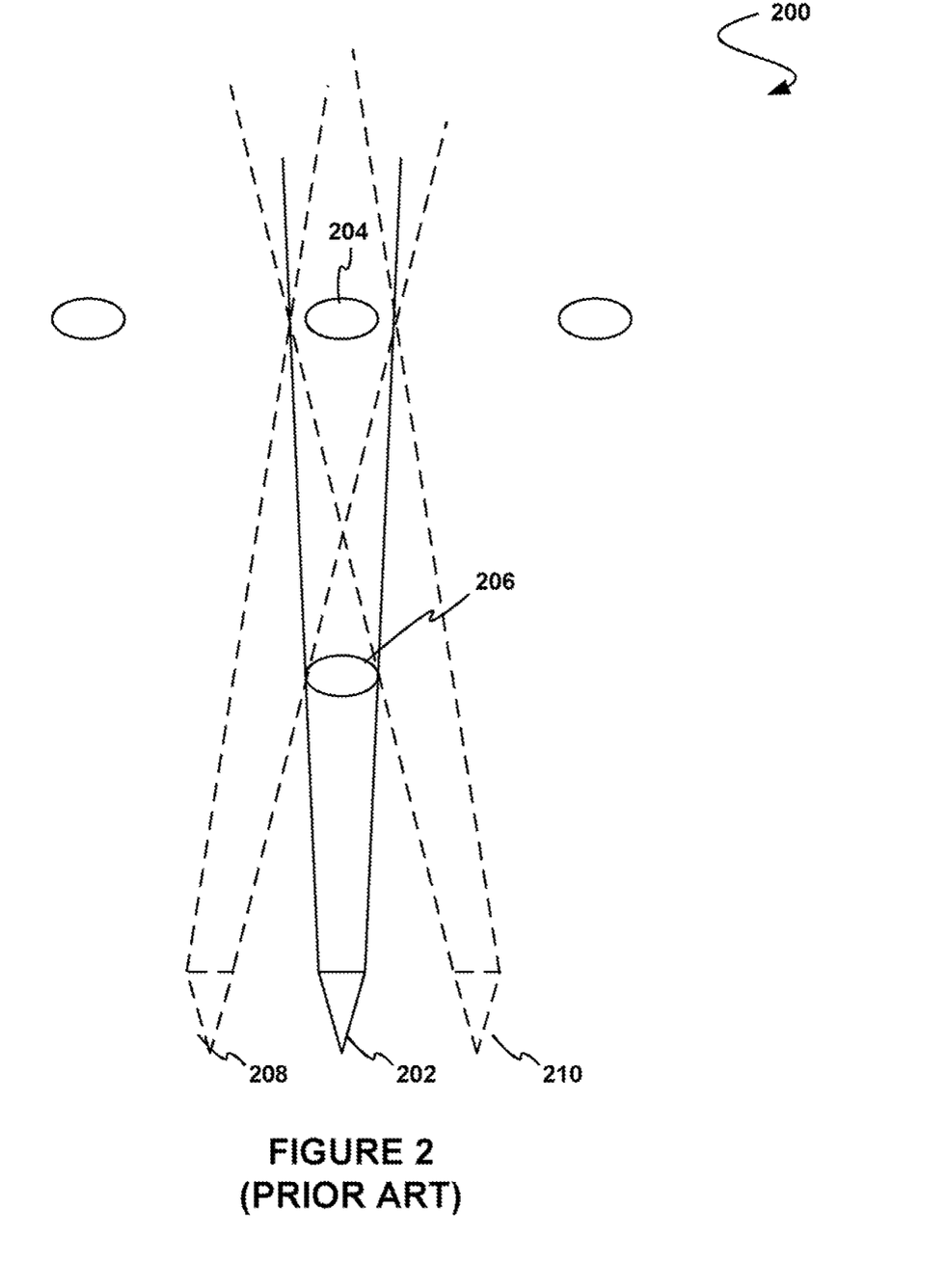
FIG. 2 shows a view of a scene represented by the depth map and two-dimensional image of FIG. 1, in accordance with the prior art.

FIG. 2 shows a view 202 of a scene 200 represented by the depth map 104 and two-dimensional image 106 of FIG. 1, in accordance with the prior art. As illustrated, the view 202 involves a plurality of background objects 204, at least one of which is occluded by a foreground object 206. As shown, information describing the occluded background object 204 is omitted.

To this end, when the depth map 104 and two-dimensional image 106 are used by the display 108 to generate a first left eye image intended for a left eye (see view 208) and a second right eye image intended for a right eye (see view 210), such images are often deficient. Specifically, by virtue of the lack of information describing the occluded background object 204, artifacts are typically introduced due to the fact that such information must be estimated from the single depth map 104 and two-dimensional image 106.

There is thus a need for addressing these and/or other issues associated with the prior art.

SUMMARY

A system, method, and computer program product are provided for generating a plurality of two-dimensional images and a plurality of depth maps for a scene at a point in time. In various embodiments, such two-dimensional images and depth maps may be utilized to generate a plurality of images.

DETAILED DESCRIPTION

Figure 3:
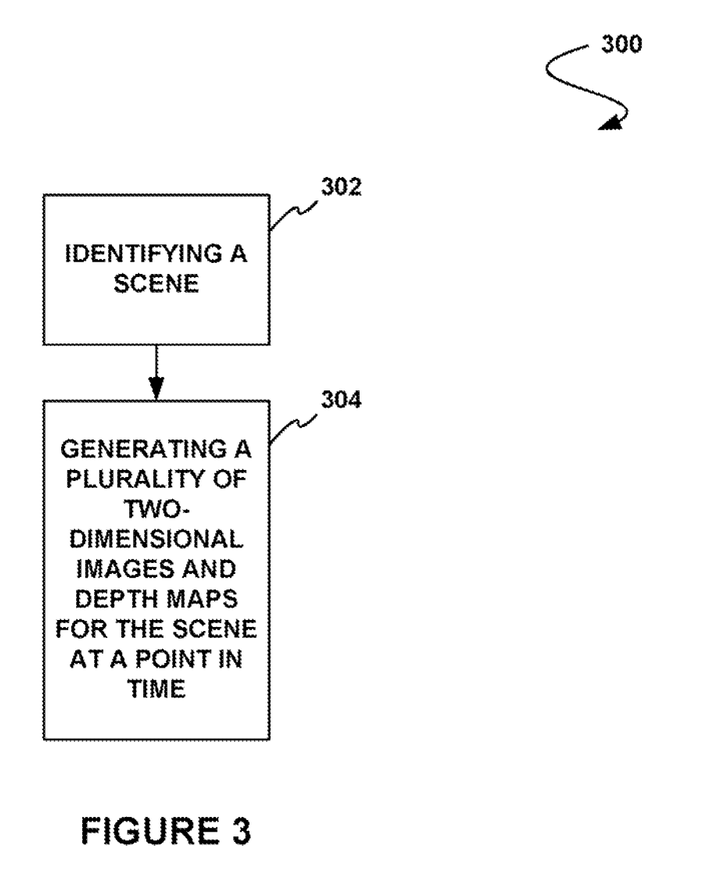
FIG. 3 shows a method for generating a plurality of two-dimensional images and depth maps, in accordance with one embodiment.

FIG. 3 shows a method 300 for generating a plurality of two-dimensional images and depth maps, in accordance with one embodiment. As shown, a scene is identified. Note operation 302. In the context of the present description, such scene may refer to any set of primitives, objects, etc. to be rendered and/or recorded. For example, in one embodiment, the scene may include one frame of a video sequence.

As set forth in operation 304, a plurality of two-dimensional images and depth maps are generated for the scene at a point in time. In the context of the present description, such two-dimensional images may include any images with at least two-dimensions that are capable of being used, at least in part, to render and/or record the scene. In various exemplary embodiments, such two-dimensional images may include coordinate (e.g. x, y, z) information, color information, and/or any other image information, for that matter.

Also in the context of the present description, the aforementioned depth maps may include any data structures that are capable of storing depth-related information which is capable of being used, at least in part, to render and/or record the scene. For example, in one embodiment, the depth maps may reflect depth information including a z-coordinate relative to the viewpoint.

In other embodiments, the depth maps may include disparity maps. Such disparity maps may be generated utilizing a plurality of disparity values. In one embodiment, each disparity value may be calculated utilizing the following formula set forth in Table 1.

TABLE 1 disparity value = maximum disparity * (1 − zero separation plane depth * (1/w))

In such formula, the maximum disparity refers to a disparity desired for infinitely far objects. Further, the zero separation plane depth refers to a depth at which it is desired to have zero disparity between left and right eye images. Still yet, the w-value may include a z-coordinate in a coordinate system centered at the view point. More information regarding such disparity maps may be found with reference to a co-pending application filed May 17, 2007 under the title "System, Method, And Computer Program Product For Generating A Disparity Map" and application Ser. No. 11/750,288, which is incorporated herein by reference in its entirety. Again, the foregoing examples of depth maps are set forth illustrative purposes only and should not be construed as limiting in any manner whatsoever, since any depth map data structure may be utilized that meets the above definition.

By this design, the two-dimensional images and the depth maps may be utilized in any desired manner to render and/or record the scene. For example, in one exemplary rendering embodiment, the two-dimensional images and the depth maps may be used to generate a plurality of images. In one embodiment, such images may each represent a viewpoint. To this end, one or more images may be generated which are intended for viewing by a left eye and one or more images may be generated which are intended for viewing by a right eye.

In various embodiments, a single left eye image may be generated for the left eye and a single right eye image may be generated for the right eye. Of course, other embodiments are contemplated where any number of images may be generated representing different viewpoints.

In any case, where the two-dimensional images and the depth maps are generated for stereoscopic viewing, additional information may thereby be made available by virtue of the fact that additional images and maps are utilized. For example, in one embodiment, the multiple two-dimensional image/depth map pairs may each reflect different views. The use of such additional information may therefore result in a higher-quality stereoscopic viewing.

Thus, when image/map pairs associated with multiple views are used, additional visual information may be afforded which, in turn, may allow appropriate viewing of various objects in the scene that would otherwise be occluded and/or require the use of estimation algorithms (which are inherently deficient). To this end, the two-dimensional images and the depth maps may be utilized to reduce artifacts. Of course, use of the foregoing techniques may be utilizing in the context of recording, as well as for rendering purposes, as noted above.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
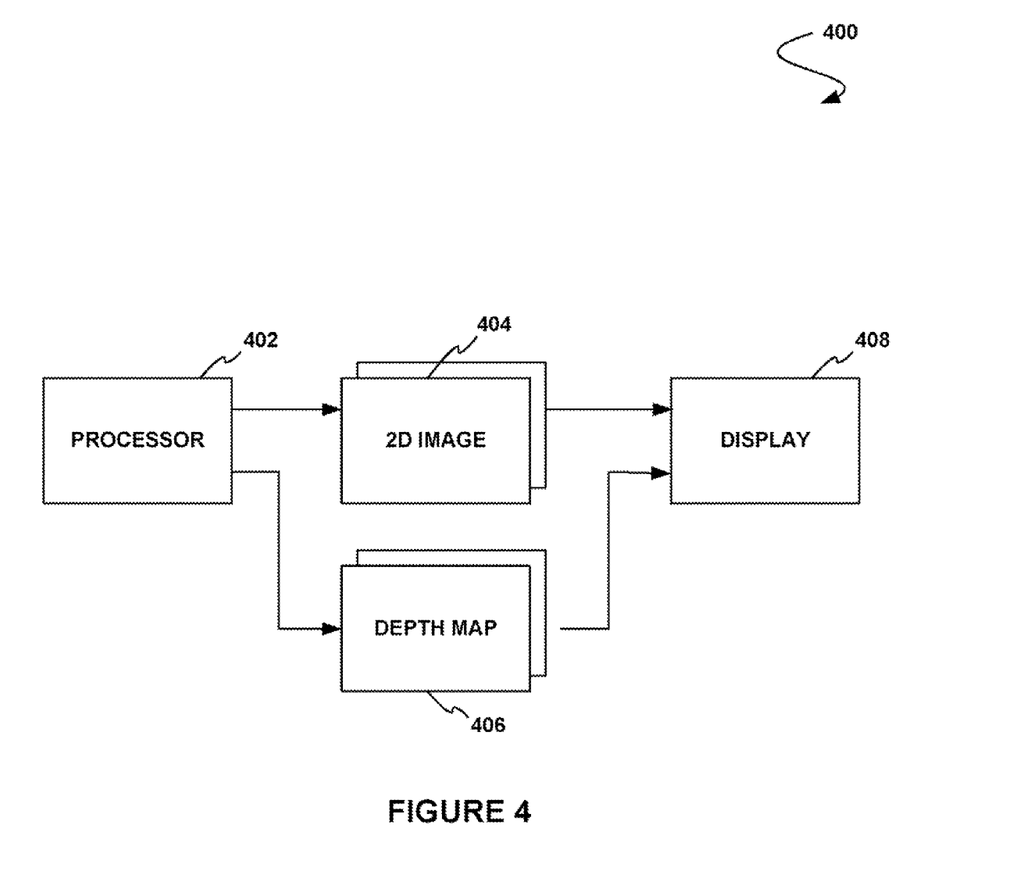
FIG. 4 shows a system for generating a plurality of two-dimensional images and depth maps, in accordance with one embodiment.

FIG. 4 shows a system 400 for generating a plurality of two-dimensional images and depth maps, in accordance with one embodiment. As an option, the present system 400 may be implemented to carry out the method 300 of FIG. 3, for example. Of course, however, the system 400 may be implemented in any desired environment. It should also be noted that the aforementioned definitions may apply during the present description.

As shown, a processor 402 (e.g. a graphics processor, etc.) is provided which may, in one embodiment, be capable of generating two or more two-dimensional images 404 and two or more depth maps 406 for a scene at a particular point in time. To this end, the two-dimensional images 404 and the depth maps 406 are both outputted from the processor 402 in the manner illustrated.

Strictly as an option, depth information associated with the depth map 406 may each be dithered. More information regarding one possible related dithering technique may be found with reference to a co-pending application filed Oct. 17, 2006 under the title "System And Method For Dithering Depth Values" and application Ser. No. 11/550,347, which is incorporated herein by reference in its entirety. It should be also noted that, as yet another option, multiple images 404 and maps 406 may be generated for a plurality of sequential scenes (e.g. in an embodiment where each scene reflects a frame of video, etc.). In yet another embodiment, any redundancy of information among the images 404 and maps 406 of a single scene (e.g. frame, etc.) may be identified and removed, for compression purposes.

By this design, the two-dimensional images 404 and the depth maps 406 may be passed to a display 408 which may, in turn, use such information for providing a stereoscopic viewing experience. Specifically, in one embodiment, the display 408 may only use the two two-dimensional images as left and right eye images for a stereoscopic display. In another embodiment, the display 408 may be used to generate three or more images for multi-view display, again utilizing the two-dimensional images 404 and the depth maps 406.

While the processor 402 and the display 408 are shown to be separate in FIG. 4, it should be noted that such components may be integrated as desired. For example, various embodiments may exist where the processor 402 may itself use the two-dimensional images 404 and/or the depth maps 406 to generate the appropriate multi-view images. Still yet, while the processor 402 is shown to calculate and output the two-dimensional images 404 and the depth maps 406 to the display 408, other embodiments are contemplated where source data may be passed instead, such that the data may be utilized by downstream processes (e.g. at the display 408) for use in generating the two-dimensional images 404 and/or the depth maps 406.

Figure 5:
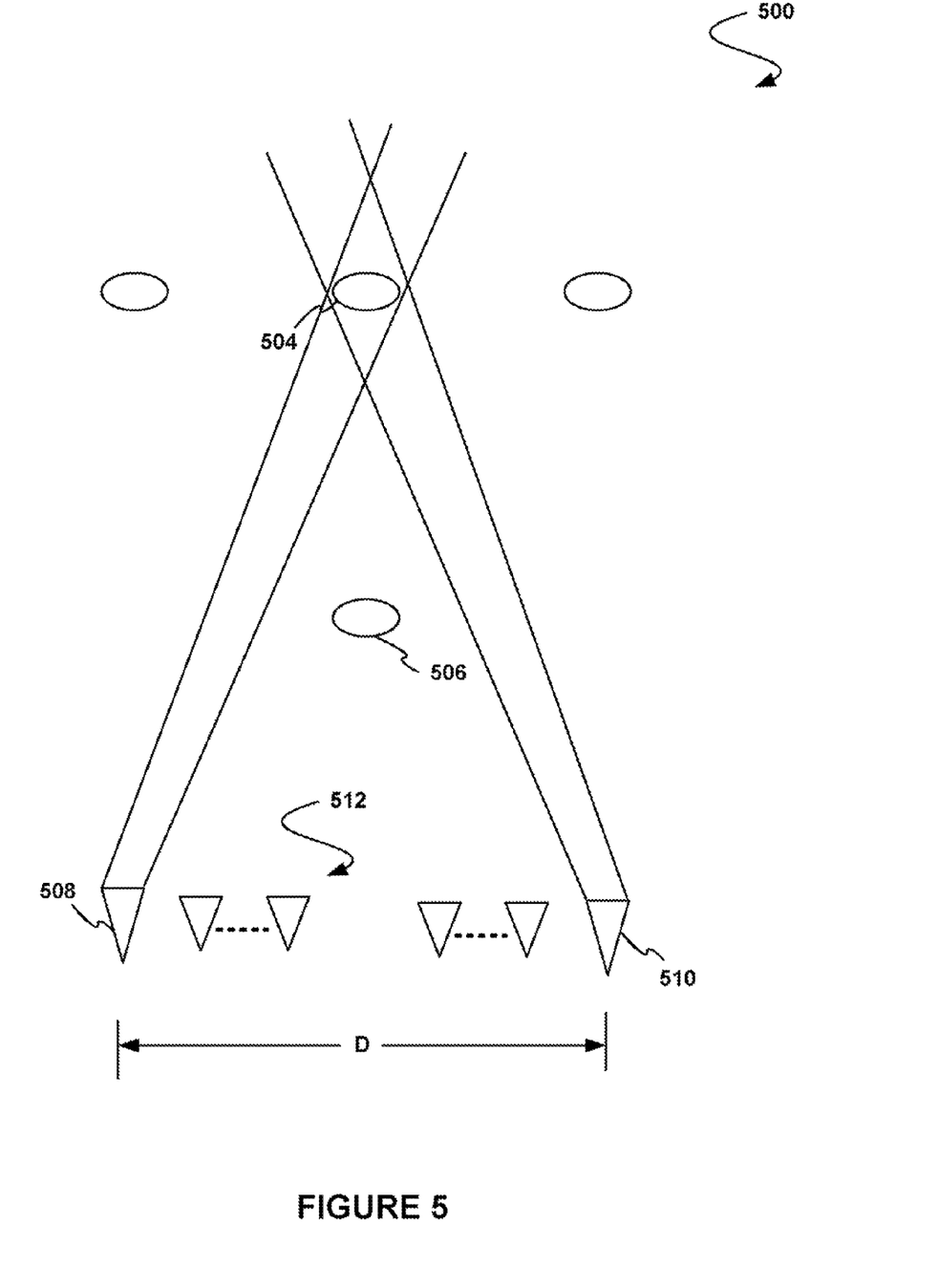
FIG. 5 shows a plurality of views of a scene represented by multiple two-dimensional images and depth maps, in accordance with one embodiment.

FIG. 5 shows a plurality of views of a scene 500 represented by multiple two-dimensional images and depth maps, in accordance with one embodiment. As an option, the present views may be represented by the two-dimensional images 404 and the depth maps 406 of FIG. 4. Of course, however, the views may be relevant in any desired environment. Again, the aforementioned definitions may apply during the present description.

As illustrated, the scene 500 involves a plurality of background objects 504, at least one of which is occluded by a foreground object 506 from the perspective of a center viewpoint. In use, information associated with a first view 508 is represented with a first two-dimensional image/depth map pair, information associated with a second view 510 is represented with a second two-dimensional image/depth map pair, and so forth. In one embodiment, the first view 508 and second view 510 may represent boundary or constraint views (i.e. the endmost views). In one embodiment, a distance D between the first view 508 and second view 510 may be a function of an average distance between a right eye and a left eye of a human.

By distancing the boundary first view 508 and second view 510 in such manner, information associated with intermediate views between the first view 508 and second view 510 may be calculated by way of interpolation. For instance, a plurality of additional images 512 may be generated by interpolating between information associated with the first two-dimensional image/depth map associated with the first view 508 and the second two-dimensional image/depth map associated with the second view 510. Note FIG. 5.

In the context of the embodiment of FIG. 4, the processor 402 may thus generate a minimal number (e.g. two, etc.) of two-dimensional image/depth map pairs, which may be forwarded to the downstream display 408. The display 408 may thus generate any desired number of images or views by way of interpolation. By this design, a minimal amount of processing and bandwidth is required by the processor 402 and intermediate communication channels, respectively (while maximizing quality). Of course, other embodiments are contemplated where the processor 402 is relied upon to generate more two-dimensional image/depth map pairs, for further quality enhancement.

To this end, when the depth maps and two-dimensional images are used by a display to generate a first left eye image intended for a left eye (see view 508) and a second right eye image intended for a right eye (see view 510), such images are more comprehensive in nature. Specifically, by virtue of the presence of information describing the occluded background object 504, for example, artifacts are avoided due to the fact that such information need not necessarily be estimated from a single depth map and two-dimensional image.

To this end, image pairs may be used in conjunction with associated depth maps to generate multiple views. In embodiments where images are those with the greatest disparity, all of the pixels may be present and other views may be extracted without necessarily having to fabricate pixels, as set forth above.

Figure 6:
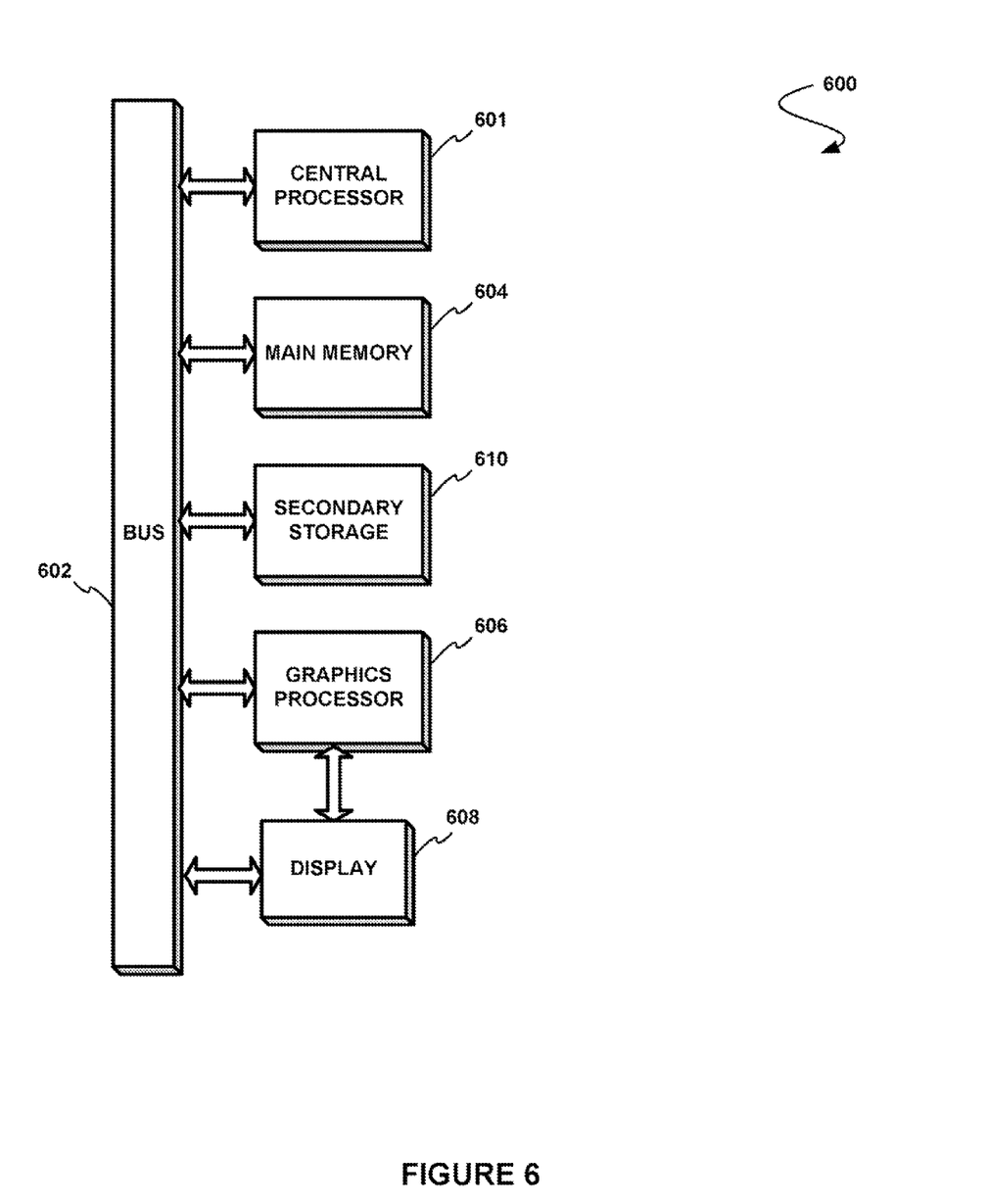
FIG. 6 illustrates an exemplary system in which the various architecture and/or functionality of different embodiments may be implemented.

FIG. 6 illustrates an exemplary system 600 in which the various architecture and/or functionality of different embodiments may be implemented. As an option, the present system 600 may be implemented in the context of the functionality and architecture of FIGS. 1-5. Of course, however, the system 600 may be carried out in any desired environment. Again, the aforementioned definitions may apply during the present description.

As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608. While one system 600 and display 608 are shown in FIG. 6, additional displays may be provided in the context of the present system 600 or other systems, as desired, for carrying out the functionality set forth hereinabove.

In one embodiment, the graphics processor 606 may include a plurality of shader modules, a rasterization module, etc. Each of the foregoing modules may even be situated on a single semiconductor platform to form a graphics processing unit (GPU). In the present description, a single semiconductor platform may refer to a sole unitary semiconductor-based integrated circuit or chip. It should be noted that the term single semiconductor platform may also refer to multi-chip modules with increased connectivity. Of course, the various modules may also be situated separately or in various combinations of semiconductor platforms per the desires of the user. For example, an embodiment is contemplated where a single-chip computer or game console includes an integrated central processor, graphics processor, etc.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In various embodiments, the architecture and/or functionality of the various other figures may be implemented in the context of the host processor 601, graphics processor 606, a chipset (i.e. a group of integrated circuits designed to work and sold as a unit for performing related functions, etc.), and/or any other integrated circuit for that matter. Still yet, the architecture and/or functionality of the various figures may be implemented in the context of a general system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices including, but not limited to a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying a set of primitives to be rendered; and
generating a plurality of two-dimensional images and a plurality of depth maps for a single frame of video associated with the set of primitives to be rendered at a single instant particular point in time such that at least two two-dimensional images and at least two depth maps are generated and output from a processor for the single frame of video associated with the set of primitives to be rendered at the single instant particular point in time;
wherein the at least two two-dimensional images include a maximum disparity for avoiding fabrication of any pixel in the single frame of video, such that all pixels of the single frame of video are present within the at least two two-dimensional images;
wherein a redundancy of information among each pair of the at least two two-dimensional images and the at least two depth maps generated and output for the single frame of video associated with the set of primitives to be rendered at the single instant particular point in time is identified and removed for compression purposes;
wherein the at least two two-dimensional images and the at least two depth maps are passed to a display, and the display generates three or more images for a multi-view display utilizing the at least two two-dimensional images and the at least two depth maps.

2. The method of claim 1, wherein the generating is carried out by the processor that includes a graphics processor.

3. The method of claim 2, wherein the two-dimensional images and the depth maps are passed from the graphics processor to the display.

4. The method of claim 1, wherein the processor includes a graphics processor.

5. The method of claim 1, wherein the three or more images are generated utilizing the display to which the two-dimensional images and the depth maps are passed by the processor that includes a graphics processor.

6. The method of claim 1, wherein the three or more images are generated by interpolating between information associated with a first one of the two-dimensional images and a second one of the two-dimensional images.

7. The method of claim 6, wherein the interpolation involves information associated with at least one of the depth maps.

8. The method of claim 7, wherein the three or more images are generated for the multi-view display by interpolating between the information associated with: the first one of the two-dimensional images and a first one of the depth maps associated with the first one of the two-dimensional images, and the second one of the two-dimensional images and a second one of the depth maps associated with the second one of the two-dimensional images.

9. The method of claim 1, wherein the two-dimensional images and the depth maps are generated for a plurality of sequential scenes, each of the scenes comprising a different portion of the set of primitives to be rendered.

10. The method of claim 1, wherein the depth maps include disparity maps.

11. The method of claim 1, wherein the depth maps include depth information from a z-buffer.

12. The method of claim 1, wherein the two-dimensional images and the depth maps are generated for recording purposes.

13. The method of claim 1, wherein the two-dimensional images and the depth maps are utilized to reduce artifacts during the multi-view display.

14. The method of claim 1, and further comprising dithering information associated with at least one of the depth maps.

15. The method of claim 1, wherein the at least two two-dimensional images include a single left eye image generated for a left eye and a single right eye image generated for a right eye.

16. The method of claim 1, wherein each pair of the at least two two-dimensional images and the at least two depth maps represent different views such that information associated with a first view is represented with a first two-dimensional image and depth map pair, and information associated with a second view is represented with a second two-dimensional image and depth map pair.

17. The method of claim 16, wherein the single frame of video associated with the set of primitives to be rendered at the single instant particular point in time includes a background object which is occluded by a foreground object from a perspective of a center viewpoint, the perspective of the center viewpoint located between the first view represented with the first two-dimensional image and depth map pair and the second view represented with the second two-dimensional image and depth map pair.

18. The method of claim 17, wherein the first view represented with the first two-dimensional image and depth map pair and the second view represented with the second two-dimensional image and depth map pair each represent a boundary, and a distance between the first view and the second view is a function of an average distance between a right eye and a left eye of a human.

19. The method of claim 1, wherein a subsequent utilization of the at least two two-dimensional images and the at least two depth maps during generation of a stereoscopic view prevents a use of any estimation algorithm during the generation of the stereoscopic view.

20. A computer program product embodied on a non-transitory computer readable medium, comprising:
computer code for identifying a set of primitives to be rendered; and
computer code for generating a plurality of two-dimensional images and a plurality of depth maps for a single frame of video associated with the set of primitives to be rendered at a single instant particular point in time such that at least two two-dimensional images and at least two depth maps are generated and output from a processor for the single frame of video associated with the set of primitives to be rendered at the single instant particular point in time;
wherein the at least two two-dimensional images include a maximum disparity for avoiding fabrication of any pixel in the single frame of video, such that all pixels of the single frame of video are present within the at least two two-dimensional images;
wherein the computer program product is operable such that a redundancy of information among each pair of the at least two two-dimensional images and the at least two depth maps generated and output for the single frame of video associated with the set of primitives to be rendered at the single instant particular point in time is identified and removed for compression purposes;
wherein the computer program product is operable such that the at least two two-dimensional images and the at least two depth maps are passed to a display, and the display generates three or more images for a multi-view display utilizing the at least two two-dimensional images and the at least two depth maps.

21. An apparatus, comprising:
a processor for generating a plurality of two-dimensional images and a plurality of depth maps for a single frame of video associated with a set of primitives to be rendered at a single instant particular point in time such that at least two two-dimensional images and at least two depth maps are generated and output from the processor for the single frame of video associated with the set of primitives to be rendered at the single instant particular point in time;
wherein the at least two two-dimensional images include a maximum disparity for avoiding fabrication of any pixel in the single frame of video, such that all pixels of the single frame of video are present within the at least two two-dimensional images;
wherein the apparatus is operable such that a redundancy of information among each pair of the at least two two-dimensional images and the at least two depth maps generated and output for the single frame of video associated with the set of primitives to be rendered at the single instant particular point in time is identified and removed for compression purposes;
wherein the apparatus is operable such that the at least two two-dimensional images and the at least two depth maps are passed to a display, and the display generates three or more images for a multi-view display utilizing the at least two two-dimensional images and the at least two depth maps.

22. The apparatus of claim 21, wherein the processor is in communication with memory and a display via a bus.

* * * * *